(12) United States Patent
Kuwabara et al.

(10) Patent No.: US 7,780,356 B2
(45) Date of Patent: Aug. 24, 2010

(54) SLIDER FOR LINEAR MOTION ROLLING GUIDE UNIT

(75) Inventors: Hideki Kuwabara, Mino (JP); Shigeki Kakei, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 52 days.

(21) Appl. No.: 12/204,999

(22) Filed: Sep. 5, 2008

(65) Prior Publication Data

US 2009/0060400 A1    Mar. 5, 2009

(30) Foreign Application Priority Data

Sep. 5, 2007    (JP) .............................. 2007-230762

(51) Int. Cl.
*F16C 33/10* (2006.01)
*F16C 29/06* (2006.01)
(52) U.S. Cl. .......................................... 384/13; 384/43
(58) Field of Classification Search .................. 384/13, 384/43, 44, 45
See application file for complete search history.

(56) References Cited

U.S. PATENT DOCUMENTS

2006/0023980 A1* 2/2006 Kato et al. .................... 384/43

FOREIGN PATENT DOCUMENTS

JP    2007-100951    4/2007

* cited by examiner

*Primary Examiner*—Thomas R Hannon
*Assistant Examiner*—Phillip A Johnson
(74) *Attorney, Agent, or Firm*—Cozen O'Connor

(57) ABSTRACT

A slider for a linear motion rolling guide unit can ensure a smooth rolling movement and a reliable lubricating capability and eliminate the need for accurate dimension control to reduce the manufacturing costs. A lubricating member A has a lubricating face 20 exposed on an outer peripheral face of a turning corner 10 in an end cap 2. The rolling elements 11 are lubricated by making contact with the lubricating face 20 while rolling through the turning corner. The lubricating face 20, exposed on the arced face 10*b* of the turning corner, and the outer peripheral face of the turning corner maintain the relation of crossing each other at two intersections. The lubricating face 20 is longer than the distance between the two intersections. Recessed areas 21 are formed between the outer peripheral face of the turning corner 10 and the lubricating face 20 in the surplus length regions.

1 Claim, 18 Drawing Sheets

Fig. 18 *Prior Art*
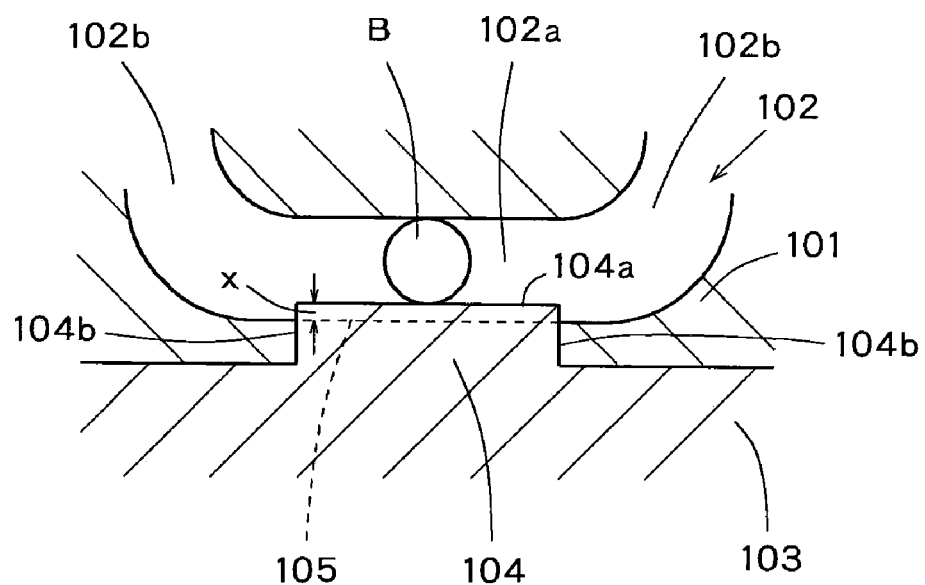

SLIDER FOR LINEAR MOTION ROLLING GUIDE UNIT

BACKGROUND OF THE INVENTION

1. Field of the Invention

This invention relates to a slider used in a linear motion rolling guide unit and causing rolling elements to roll on raceway faces provided on a track rail to achieve a smooth relative movement on the rail.

2. Description of the Related Art

Conventionally, this type of slider for a linear motion rolling guide unit is known from JP-2007-100951A.

The slider comprises a casing and end caps secured at the two ends of the casing, and provides for circulation paths which are made up of rolling paths formed in the casing and turning corners formed in the end caps for allowing the rolling elements to move around the circulation paths. The end caps have mounted on them lubricating members impregnated with a lubricant. A portion of each of the lubricating members is exposed to the inside of each of the turning corners formed in the end caps. FIG. 18 shows a specific structure of the lubricating member and the turning corner.

As illustrated in FIG. 18, a turning corner 102 is formed in an end cap 101. The end cap 101 is coupled to a casing which is not shown but located above the end cap 101 in FIG. 18, so that the two ends of the turning corner 102 are each connected directly to a rolling path formed in the casing.

The turning corner 102 is made up of a linear straight portion 102a and arc-shaped portions 102b directly adjoining the straight portion 102a and having a predetermined curvature.

On the other hand, the end cap 101 is fitted with a lubricating member 103. The lubricating member 103 has a raised portion 104 exposed to the straight portion 102a of the turning corner 102. The leading end face of the raised portion 104 has a lubricating face 104a which is parallel to the straight portion 102a.

A plurality of rolling elements B are installed in the turning corner 102, and roll through the turning corner 102. The rolling elements B make contact with the lubricating face 104a in the process of rolling in the straight portion 102a, and are coated with the lubricant held in the lubricating member 103 and dispensed from the lubricating face 104a.

In this manner, because the rolling elements B are lubricated during their passage through the turning corner 102, the smooth rolling of the rolling elements B can be maintained for a long time.

In order to lubricate the rolling elements B as described above, it follows that the lubricating face 104a is required to protrude beyond or to be flush with the outer periphery face 105 of the turning corner 102.

However, if the lubricating face 104a projects too much beyond the outer periphery face 105 so as to increase the protrusion x created between the outer periphery face 105 and the lubricating face 104a, this obstructs the smooth rolling of the rolling elements B. On the other hand, if the lubricating face 104a is slightly lower than the outer periphery face 105, the rolling elements B cannot be completely lubricated.

For the purpose of reliably making full use of the lubricating capability without inhibiting the rolling movement of the rolling elements B, it is necessary to ensure accurate dimensions such that the lubricating face 104a and the outer peripheral face 105 are flush with each other. For this purpose, a complicated manufacturing process and intricate assembling process are required, resulting in an increase in manufacturing costs.

SUMMARY OF THE INVENTION

It is an object of the present invention to provide a slider for a linear motion rolling guide unit which is capable of ensuring a smooth rolling movement and a reliable lubricating capability and also of eliminating the need for accurate dimension control to reduce the manufacturing costs.

The present invention provides a slider for a linear motion rolling guide unit, comprising: a casing having rolling paths for guiding rolling elements; a pair of end caps fixed respectively to two opposing ends of the casing and having turning corners formed therein, the turning corners having arced faces directly connecting with the rolling paths; and a lubricating member provided either one or both of the pair of end caps and having a lubricating face exposed to each of the turning corners. The rolling paths and the turning corners form circulation paths through which the rolling elements roll and circulate. The rolling elements make contact with the lubricating faces and being lubricated in the process of rolling through the turning corners. The slider is characterized in that the lubricating face is exposed on the arced face of the turning corner, and the lubricating face and the outer peripheral face of the turning corner maintain the relation of crossing each other at two intersections, and additionally, the lubricating face has a length longer than the distance between the two intersections, and recessed areas are respectively formed between the outer peripheral face of the turning corner and portions of the lubricating face in surplus length regions determined by the difference between the length of the lubricating face and the distance between the two intersections.

Regarding the two intersections of the lubricating face and the outer peripheral face of the turning corner which cross each other, the two intersections can be located in the arced face, or alternatively, one of them can be located in the arced face and the other can be located in the straight portion adjoining the arced face, either of which is included in the present invention.

That is, the exposure of the lubricating face on the arced face of the turning corner includes when a part of the lubricating face is exposed to the straight portion.

According to the present invention, the length of the lubricating face is longer than the distance, or the length, between the two intersections of the lubricating face with the outer peripheral face of the turning corner, and the recessed areas are formed between the outer peripheral face and the lubricating face in the respective surplus length regions. Accordingly, even if a dimensional error caused in the manufacturing process leads to an increase in the amount of protrusion of the lubricating face on the arced face, as long as the dimensional error in question is within the range of the depth of the recessed area, a difference in level is not produced between the outer peripheral face of the turning corner and the lubricating face.

In short, according to the present invention, even if a dimensional error or an assembly error occurs in the lubricating member, the end cap and the like, the error can be absorbed by the recessed area, so that an unnecessary difference in level is not produced between the lubricating face and the turning corner, and additionally, the rolling elements can be reliably and sufficiently lubricated.

Then, such absorption of the dimensional error or the assembly error eliminates the need of precision dimensional control, thus achieving easy assembling work. As a result, the degree of flexibility in design is increased, making it possible to significantly reduce the costs in the manufacturing process.

In addition, according to the present invention, since the lubricating face is exposed on the arced face of the turning corner, the length of the portion of the lubricating face making contact with the rolling elements can be selectively determined simply by changing the amount of exposure of the lubricating face. Accordingly, an unnecessary increase in the contact length between the rolling elements and the lubricating face is prevented, so that the rolling elements will not be coated with a large amount of lubricant, and there will not exhaust the lubricant promptly.

Further, because the recessed areas also have the function of accumulating oil, abraded powder and the like, the sliding movement of the slider is made smoother.

BRIEF DESCRIPTION OF THE DRAWINGS

FIG. 18 is a diagram illustrating a conventional lubricating member.

BEST MODE FOR CARRYING OUT THE INVENTION

A slider for a linear motion rolling guide unit according to the present invention will be described below with reference to FIG. 1 to FIG. 17.

Figure 1:
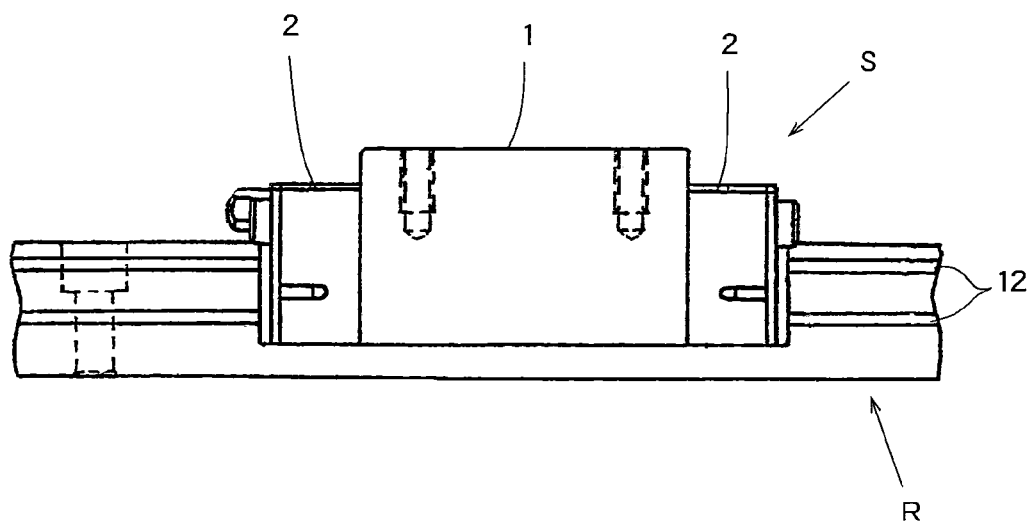
FIG. 1 is a side view of a linear motion rolling guide unit in an embodiment of the present invention.
Figure 2:
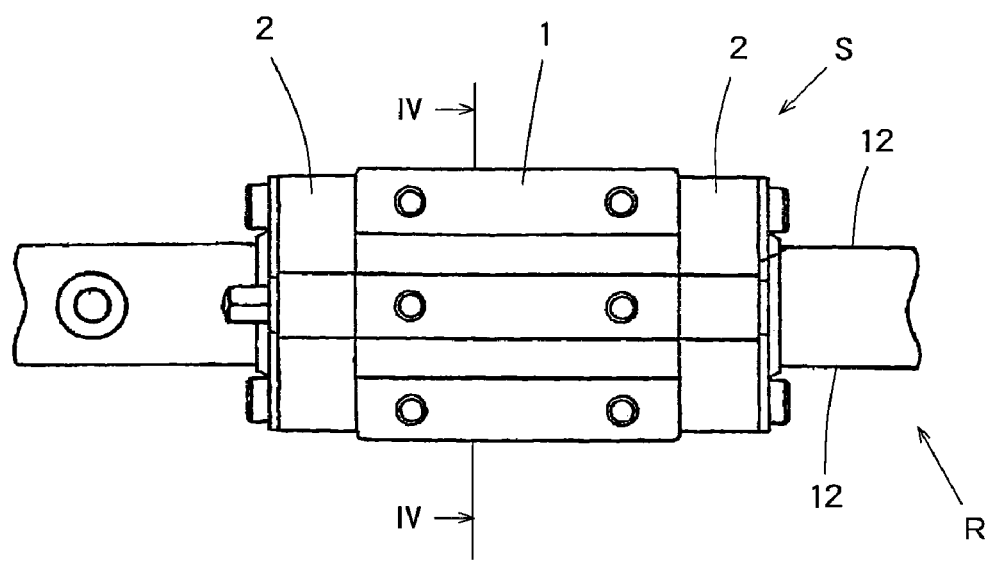
FIG. 2 is a plan view of the linear motion rolling guide unit in FIG. 1.
Figure 3:
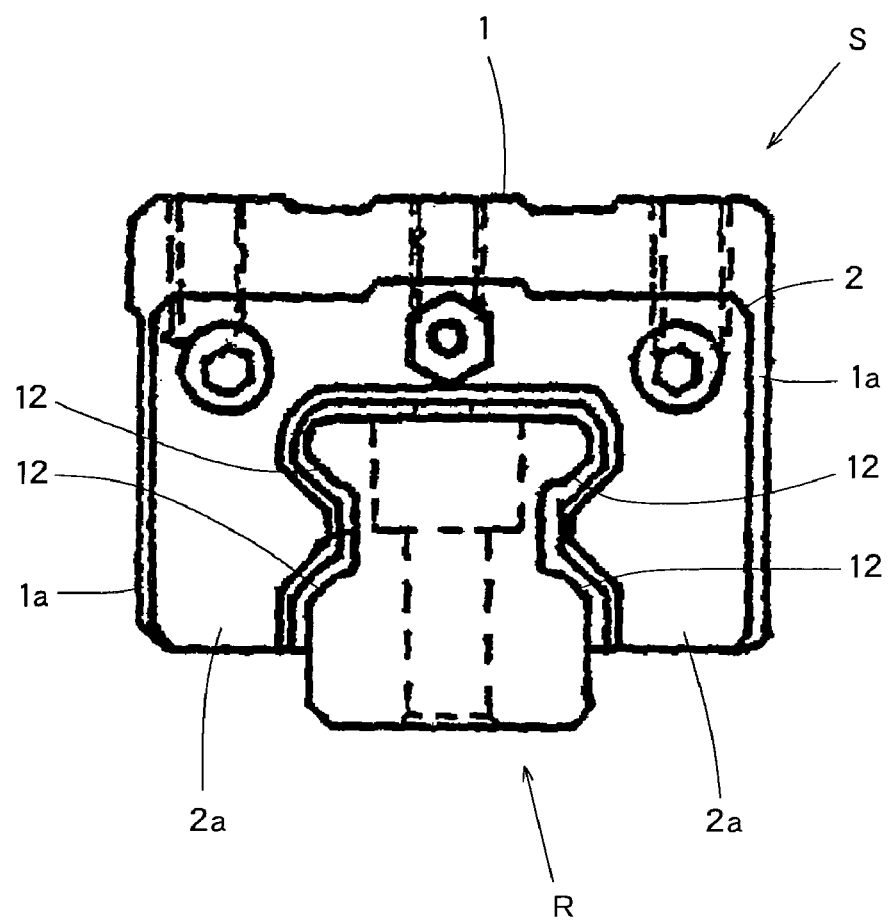
FIG. 3 is a front view of the linear motion rolling guide unit in FIG. 1.

As illustrated in FIG. 1 to FIG. 3, a slider S of the present invention, which slides in the longitudinal direction of a track rail R, comprises a casing 1 and a pair of end caps 2 respectively attached to the two ends of the casing 1. As shown in FIG. 3, the casing 1 has a pair of arms 1a, and also each of the end caps 2 has a pair of arms 2a. The pair of arms 1a and the pair of arms 2a are located opposite each other on either side of the track rail R as shown in FIG. 3 such that the slider S straddles the track rail R.

Figure 4:
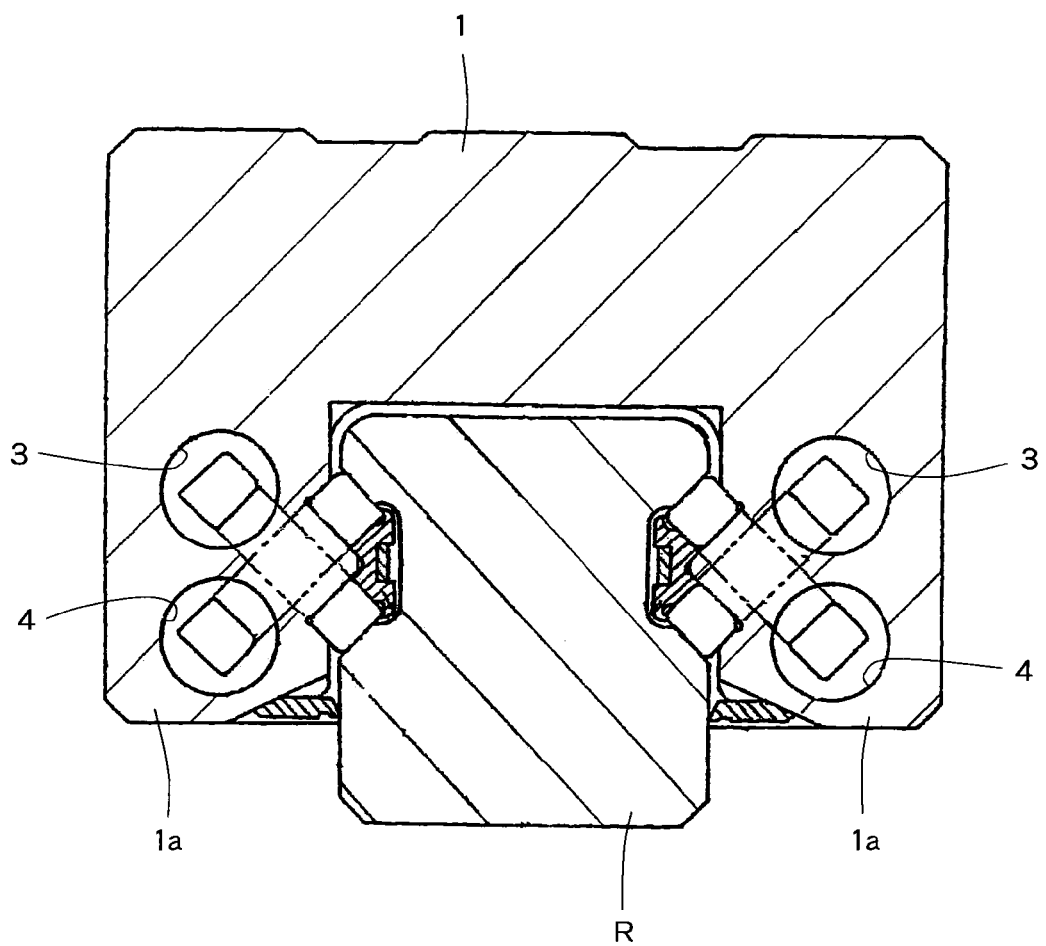
FIG. 4 is a sectional view taken along the IV-IV line in FIG. 2.

As illustrated in FIG. 4, each of the arms 1a of the casing 1 has a pair of rolling paths 3, 4 formed therein.

Figure 5:
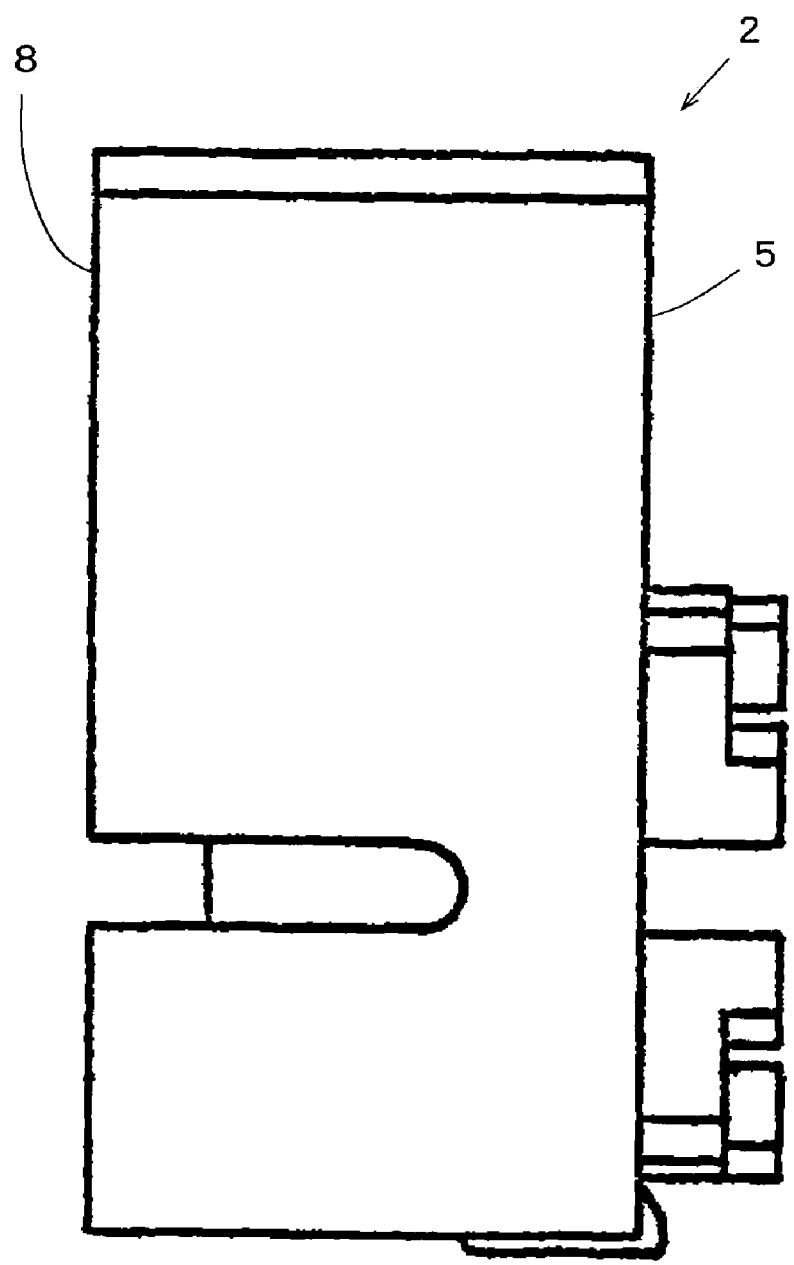
FIG. 5 is a side view of an end cap of the embodiment.
Figure 6:
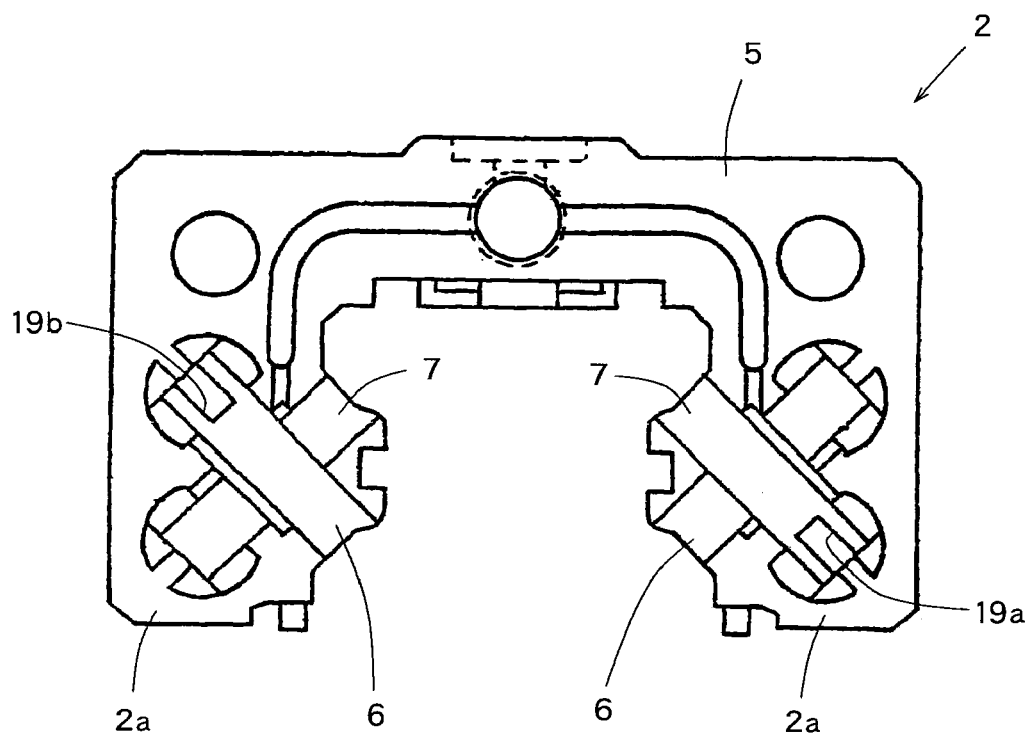
FIG. 6 is a front view of the face of the end cap which is fixed to a casing.
Figure 7:
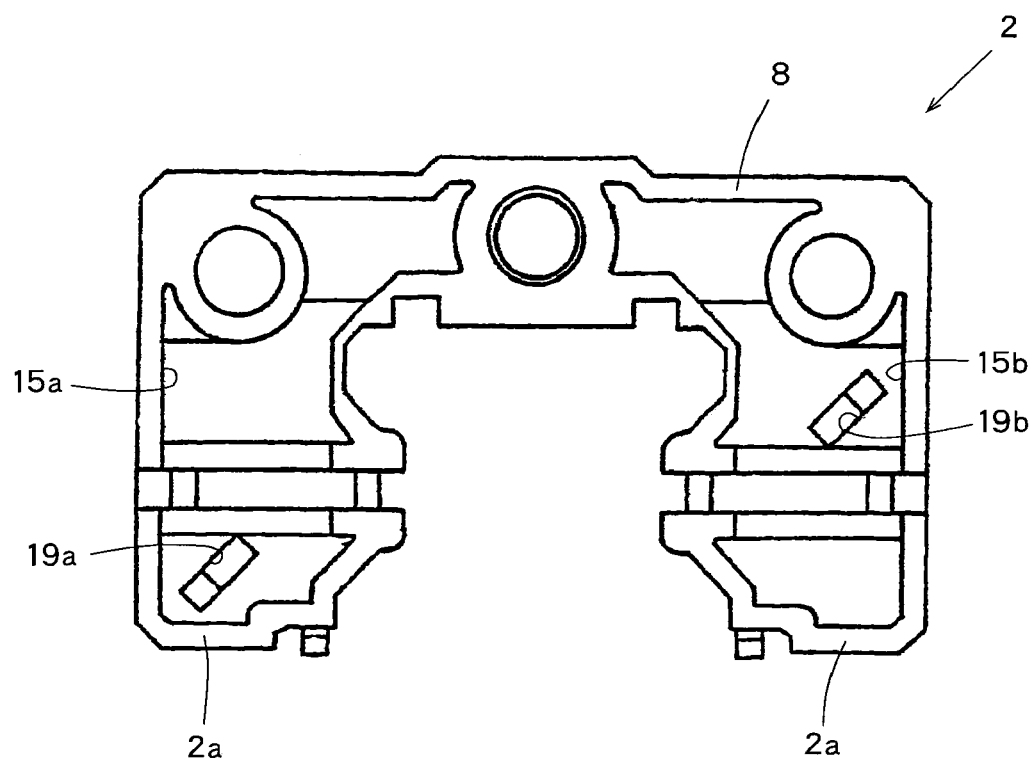
FIG. 7 is a front view of the reverse face of the end cap to the casing-fixed face shown in FIG. 6.

On the other hand, each of the end caps 2 is shown in FIG. 5 to FIG. 7. As shown in FIG. 5, the end cap 2 has a face 5 which is in contact with the casing 1 and fixed to the casing 1. As shown in FIG. 6, the end cap 2 has arms 2a in each of which a pair of fitting recesses 6, 7 are formed. The fitting recesses 6, 7 respectively have opening sides formed in the face 5 and intersect each other. FIG. 7 illustrates the other face 8 of the end cap 2 opposite to the face 5.

Figure 8:
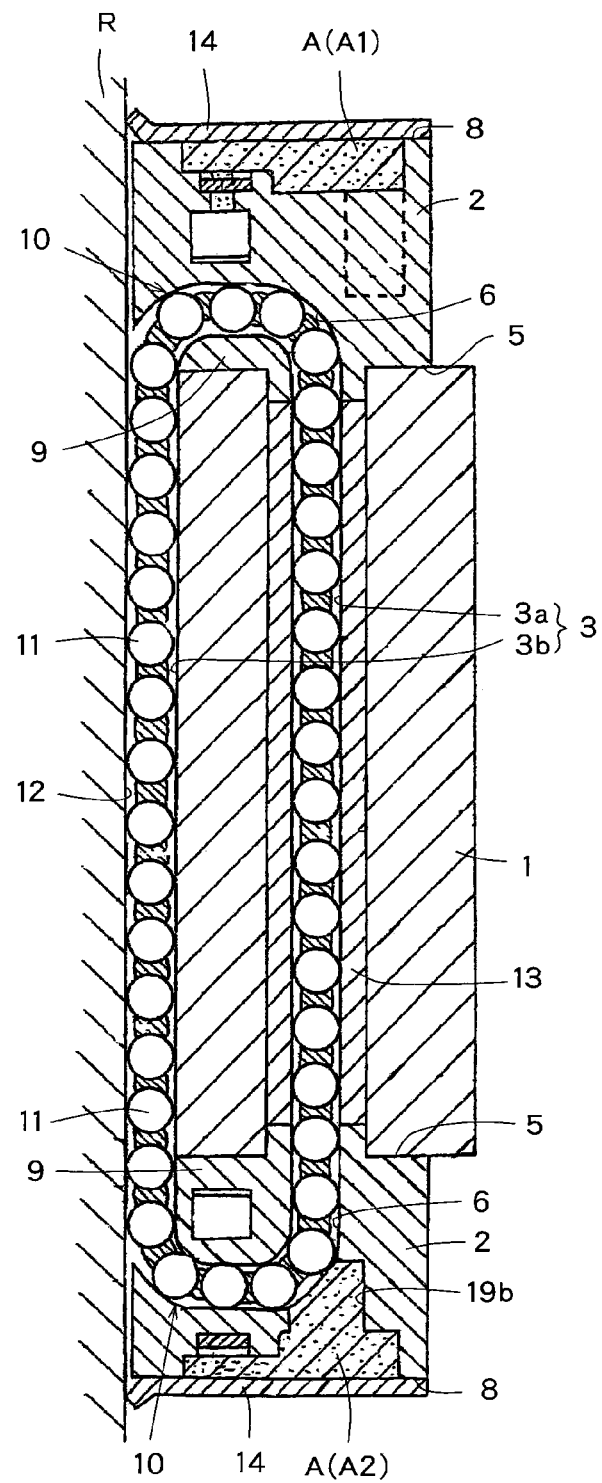
FIG. 8 is a sectional view showing the circulation path of a slider in FIG. 1.

FIG. 8 illustrates the casing 1 and the end caps 2 coupled to the casing 1. As seen from FIG. 8, the rolling path 3 extends in the longitudinal direction of the casing 1 and is composed of a race path 3b facing the raceway face 12 of the track rail R and a through hole 3a provided for allowing the rolling elements to return.

On the other hand, in each end cap 2, a spacer 9 is fixed to the face 5 so that the spacer 9 and the fitting recess 6 (or fitting recess 7) form a turning corner 10. The through hole 3a and the race path 3b are directly connected to the turning corner 10, so that the rolling path 3 and the turning corners 10 form a circulating path.

A plurality of rolling elements 11 are rotatably mounted in the circulating path made up of the rolling path 3 and the turning corners 10. Then, when the slider S made up of the casing 1 and the end caps 2 is moved relative to the track rail R, the rolling elements 11 roll on the raceway face 12 of the track rail R, resulting in the smooth sliding movement of the slider S on the track rail R.

FIG. 8 shows a sleeve 13 which is formed of a molded porous part made of sintered resin and provided for lubricating the rolling elements 11 traveling through the rolling path 3 (through hole 3a). The molded porous part has a porous portion which is formed of a sintered resin produced by compressing and heating a fine powder of an ultra high molecular weight synthetic resin, with the voids between the fine synthetic resin particles being thus retained in shape so as to make interconnection. As a result, the molded porous part can be impregnated with a lubricant.

Lubricant members A are respectively inserted into the end caps 2 from the faces 8. Then, end seals 14 are attached onto the faces 8.

Figure 9:
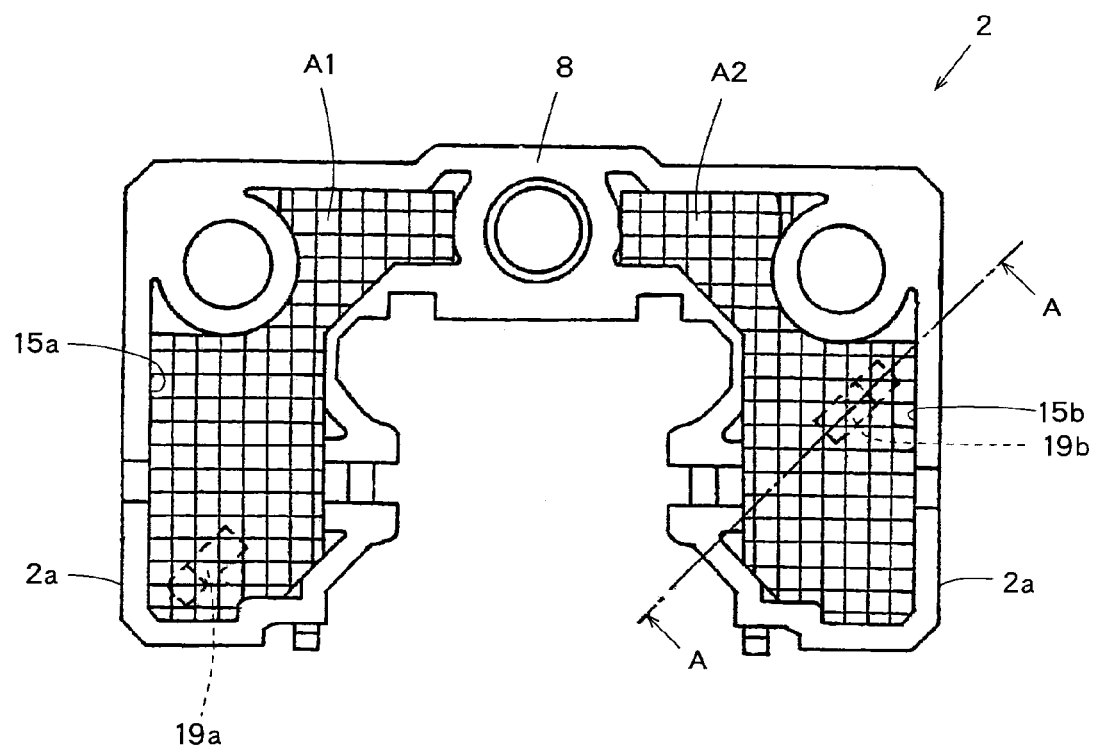
FIG. 9 is a front view of the end cap mounted with a lubricating member in the embodiment.

As in the case of the sleeve 13, the lubricating member A is formed of a molded porous part made of sintered resin and impregnated with a lubricant. As shown in FIG. 9, each of the lubricating members A is fitted into each end cap 2 from the face 8. Receiving recesses 15a, 15b are symmetrically formed in the face 8 of the end cap 2. In the case shown in FIG. 9, the receiving recess 15a located on the left in FIG. 9 is mounted with a lubricating member A1 and the receiving recess 15b located on the right in FIG. 9 is mounted with a lubricating member A2.

Figure 10:
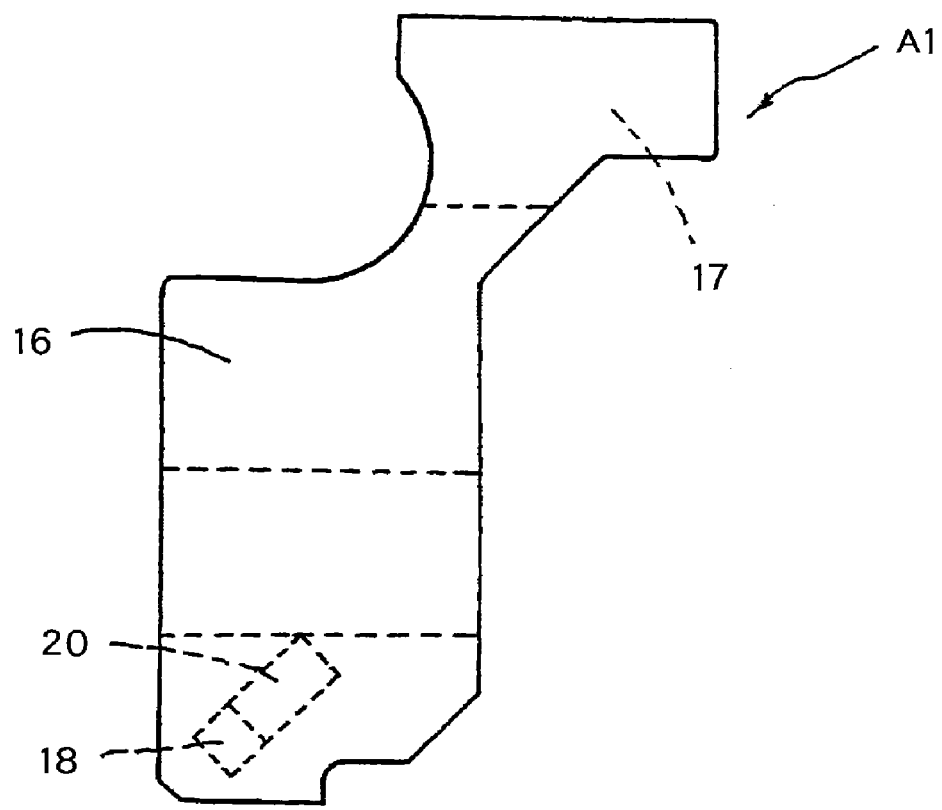
FIG. 10 is a plane view showing one of the lubricating members in the embodiment.
Figure 11:
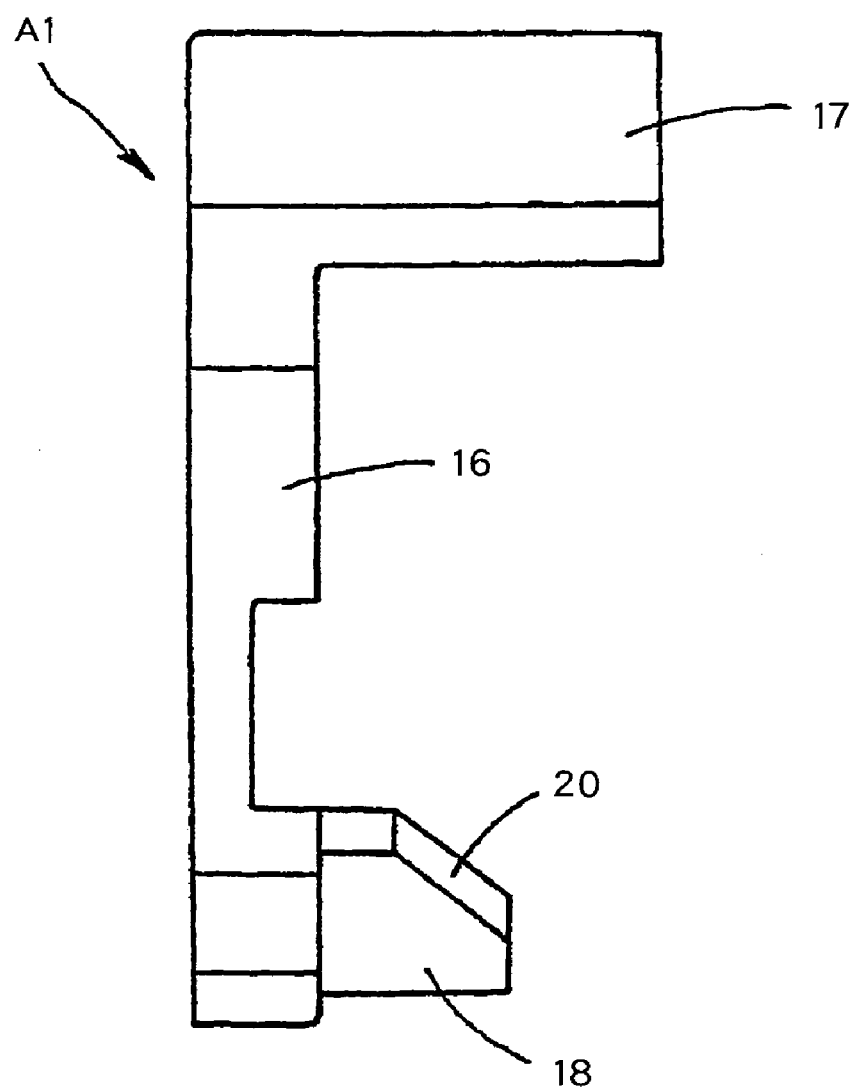
FIG. 11 is a side view of the lubricating member in FIG. 10.
Figure 12:
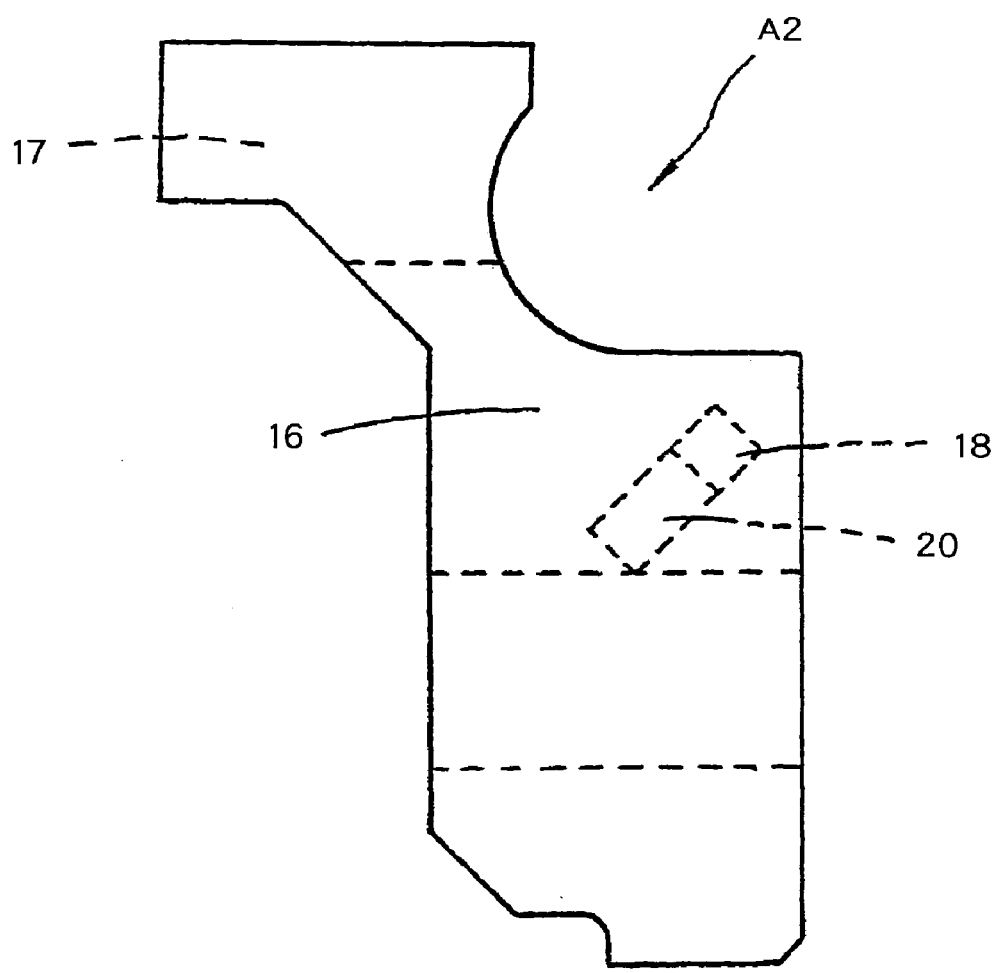
FIG. 12 is a plane view showing the other lubricating member in the embodiment.
Figure 13:
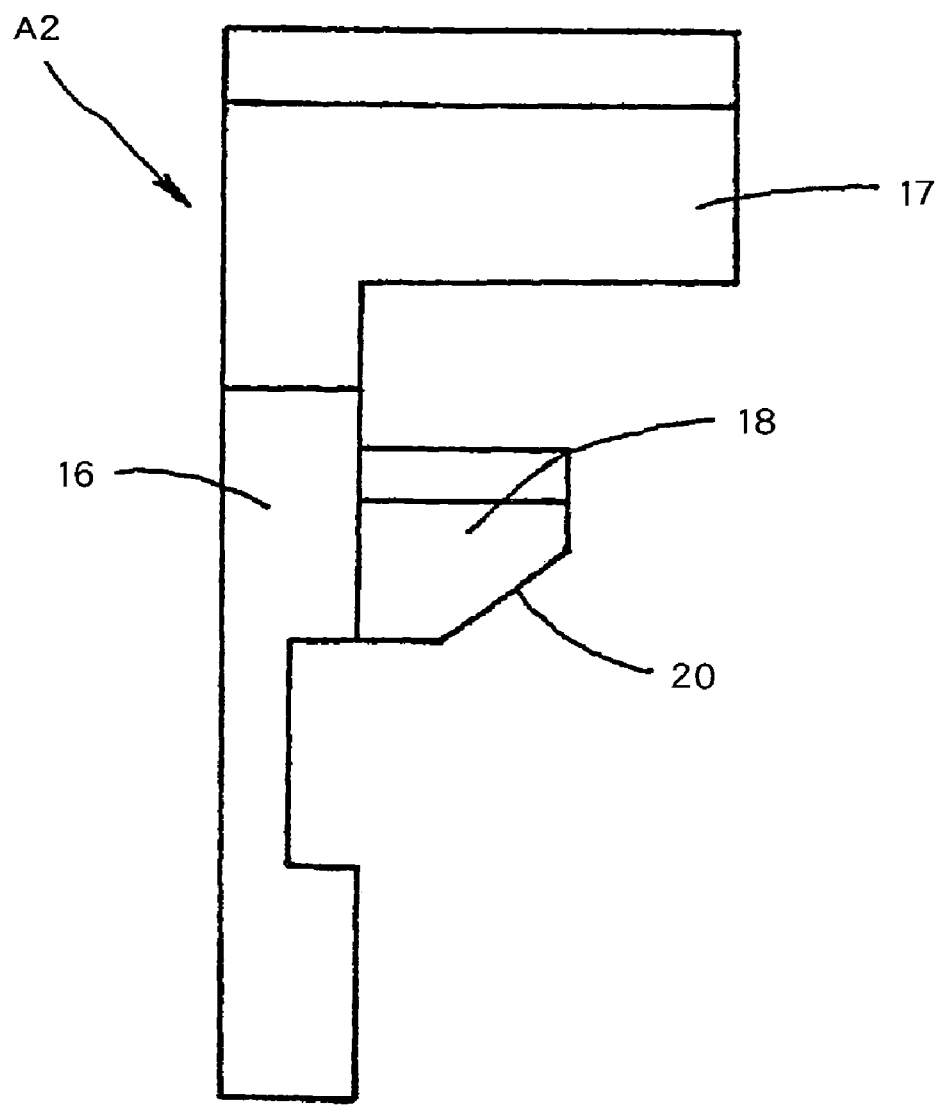
FIG. 13 is a side view of the lubricating member in FIG. 12.

FIG. 10 is a plane view of the lubricating member A1. FIG. 11 is a side view of the lubricating member A1. FIG. 12 is a plane view of the lubricating member A2. FIG. 13 is a side view of the lubricating member A2.

As illustrated in FIG. 10 to FIG. 13, each of the lubricating members A1, A2 has a body 16 formed in a flat shape exactly fitted into the respective receiving recesses 15a, 15b. As is seen from FIG. 11 and FIG. 13, each of the lubricating members A1, A2 has a projection 17 projecting from the body 16 and a raised portion 18 which extends from the body 16 less than the projection 17.

When the lubricating members A1, A2 are fitted into the end cap 2, the projections 17 respectively make close contact with and are secured to the receiving recesses 15a, 15b. The projections 17 are provided in this manner for the purpose of increasing the volume of the lubricating members A1, A2 so as to increase the amount of lubricant with which they are impregnated.

On the other hand, the raised portion 18 projecting from the body 16 has the function of lubricating the rolling elements 11 rolling through the turning corner 10, as described in detail below.

As illustrated in FIG. 7 and FIG. 9, the receiving recesses 15a, 15b of each end cap 2 respectively have through holes 19a, 19b drilled through the end cap 2. That is, as is seen from FIG. 6, the through hole 19a is positioned in the fitting recess 7, while the through hole 19b is positioned in the fitting recess 6.

After the lubricating members A1, A2 are fitted in each end cap 2, the raised portions 18 of the respective lubricating members A1, A2 are fitted into the corresponding though holes 19a, 19b so as to face the turning corners 10. The relationship between the raised portion 18 and the turning corner 10 made at this stage will be described next with reference to FIG. 14 to FIG. 16.

Figure 14:
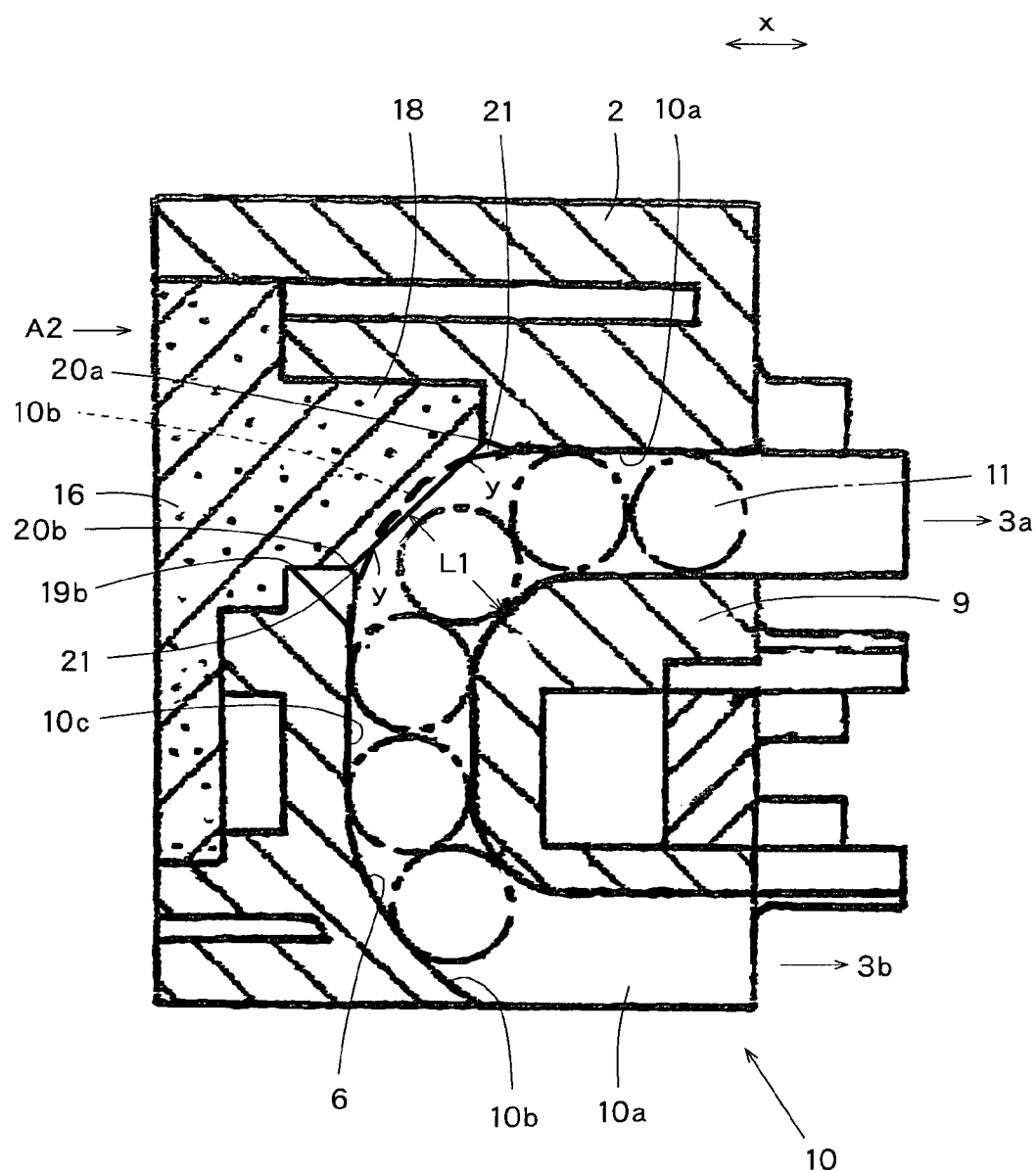
FIG. 14 is a side sectional view of the end cap with the lubricating member.

FIG. 14 is a sectional view taken along the A-A line in FIG. 9, in which the case of fitting the lubricating member A2 in the end cap 2 will be described below by way of example.

As is seen from FIG. 14, the turning corner 10 is formed in the end cap 2 by the fitting recess 6 and the spacer 9. The turning corner 10 is made up of contiguous straight portions 10a directly connecting with the rolling path 3 (specifically, respectively connecting with the through hole 3a and the race path 3b) of the casing 1; arced faces 10b adjoining the respective contiguous straight portions 10a, 10a and having a predetermined curvature; and a straight portion 10c adjoining the arced faces 10b. The through hole 19b has its open end in the arced face 10b. The straight portion 10c is approximately at right angles to the contiguous straight portion 10a (the rolling path 3).

Figure 15:
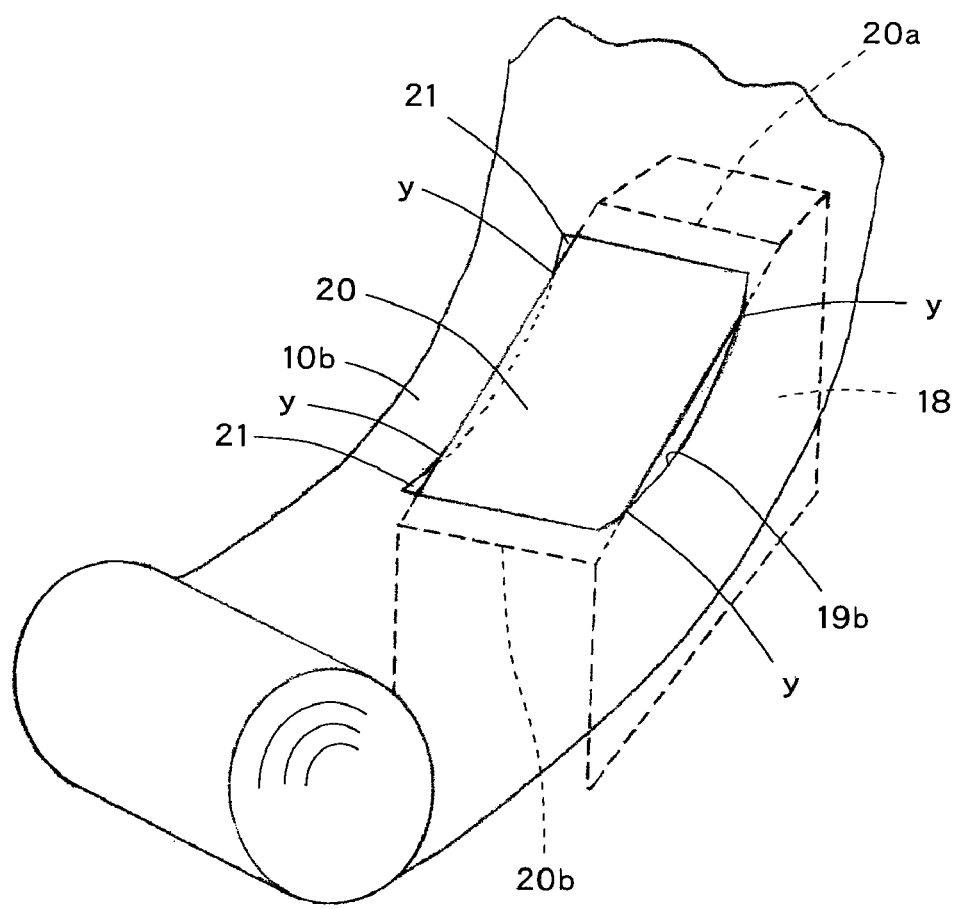
FIG. 15 is a three-dimensional view showing the relationship between the lubricating face and the turning corner.

On the other hand, as shown in FIG. 15, the leading end of the raised portion 18 of the lubricating member A2 is partially cut away to form a flat lubricating face 20. When the raised portion 18 is fitted into the through hole 19b, the lubricating face 20 is exposed on the arced face 10b of the turning corner 10. The lubricating face 20 and the turning corner 10 (particularly, the arced face 10b) cross each other at two intersections y, such that the lubricating face 20 defines a chord on the outer peripheral face (arced face 10b) of the turning corner 10.

Figure 16:
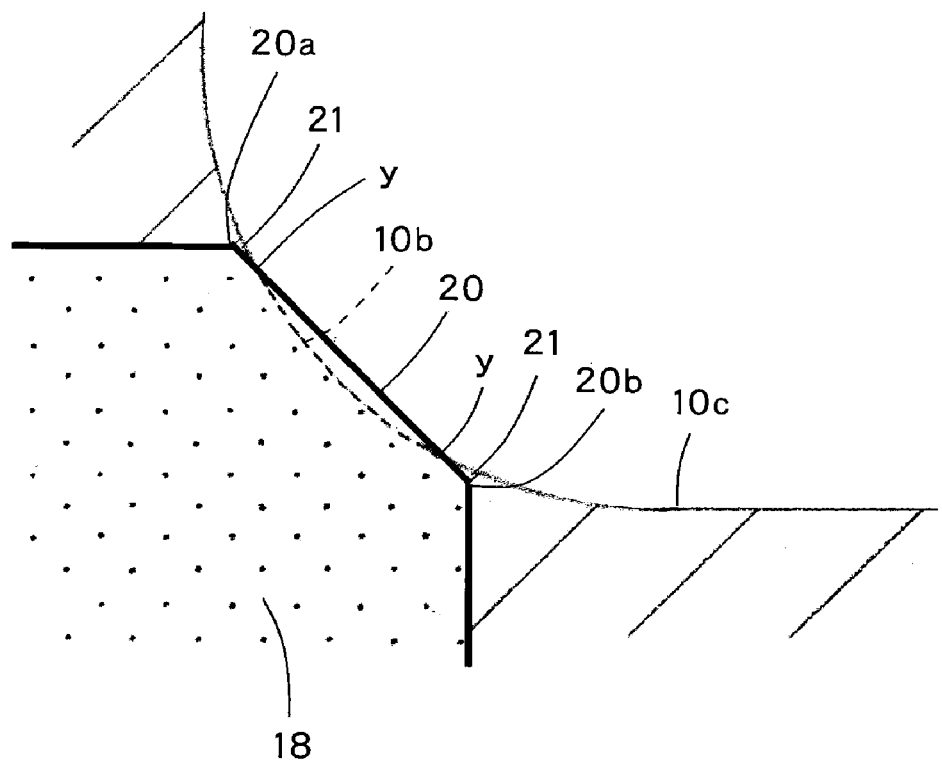
FIG. 16 is a plane view showing the relationship between the lubricating face and the turning corner.

As seen from FIG. 16, the two ends 20a, 20b of the lubricating face 20 are respectively located outward beyond the intersections y. In other words, the length of the lubricating face 20 is longer than the distance between the two intersections y with the arced face 10b. Recessed areas 21 are respectively formed between the arced face 10b and the portions of the lubricating face 20 in the surplus length regions determined by this difference in length.

In this manner, the central portion of the lubricating face 20 protrudes from the arced face 10b into the turning corner 10, and portions of the lubricating face 20 close to the two ends 20a, 20b are located below or outside the turning corner 10 at a depth corresponding to the depth of the recessed area 21. Accordingly, if a dimensional error or an assembly error is caused in the end cap 2 or in the lubricating member A within the range of the depth of the recessed area 21, the recessed area 21 can absorb the error.

In other words, even if the end cap 2 or the lubricating member A with approximately incorrect dimensions are made, as long as the error is within the range of the depth of the recessed area 21, a difference in level is not produced between the outer peripheral face of the turning corner 10 and the lubricating face 20. As a result, the rolling elements 11 can be sufficiently lubricated.

Since centrifugal force acts when the rolling elements 11 pass through the arced face 10b, if the lubricating face 20 protrudes from the arced face 10b, the rolling elements 11 are reliably pressed against the lubricating face 20. Accordingly, strict dimensional control is not necessary to perform on the distance L1 between the inner periphery of the arced face 10b and the lubricating face 20 as long as the passage of the rolling elements 11 is possible. It is clear from this that the dimensional control on the end cap 2 and the lubricating member A can be eased.

Figure 17:
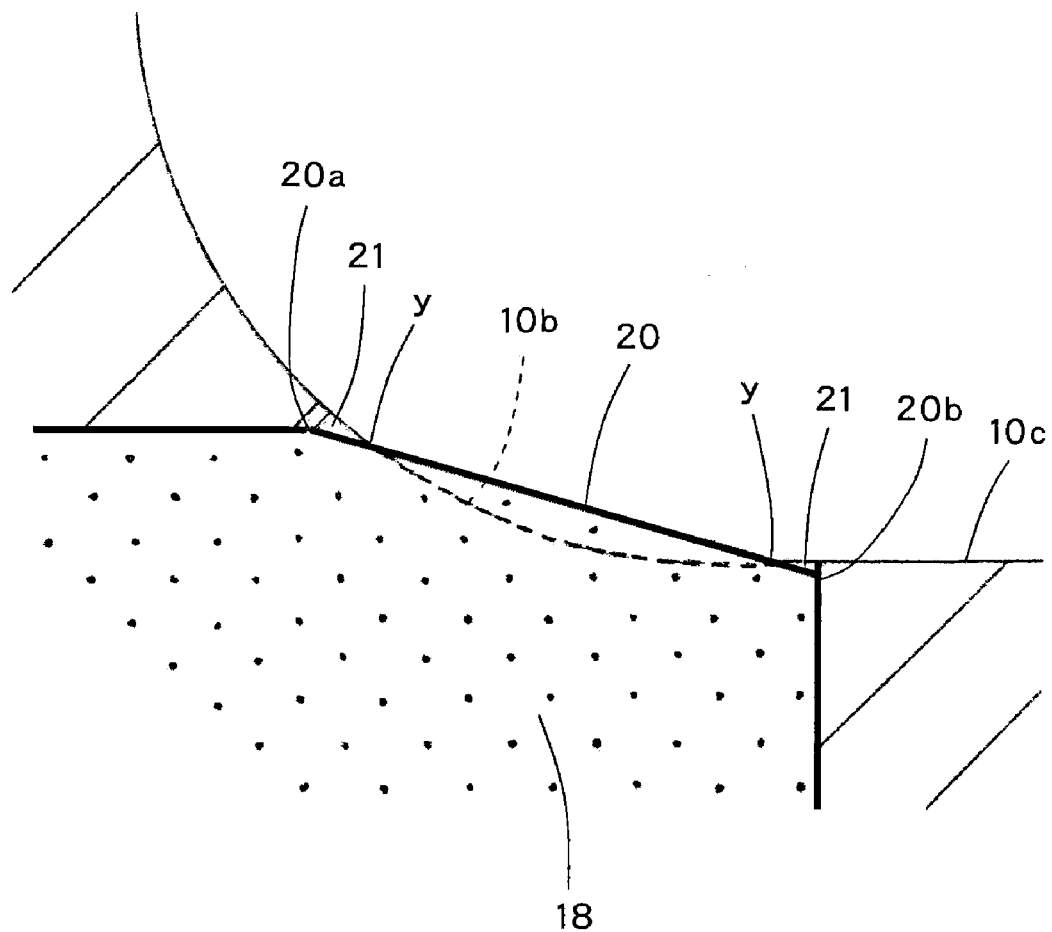
FIG. 17 is a plane view showing the relationship between the lubricating face and the turning corner in another embodiment.

In the aforementioned embodiment, the two intersections between the lubricating face 20 and the outer peripheral face of the turning corner 10 are situated within the arced face 10b, but the lubricating face 20 may be located in an area including the arced face 10b and the straight portion 10c as illustrated in another embodiment in FIG. 17.

Specifically, one of the two intersections between the lubricating face 20 and the outer peripheral face of the turning corner 10 may be located within the arced face 10b and the other may be located within the straight portion 10c or the contiguous straight portion 10a. In such a design, the lubricating face 20 still protrudes from the arced face 10b, so that the same advantageous effects as those described earlier can be obtained.

What is claimed is:

1. A slider for a linear motion rolling guide unit, comprising:

a casing having rolling paths for guiding rolling elements;

a pair of end caps fixed respectively to two opposing ends of the casing and having turning corners formed therein, the turning corners having arced faces directly connecting with the rolling paths; and a lubricating member provided either one or both of the pair of end caps and having a lubricating face exposed on an outer peripheral face of each of the turning corners, the rolling paths and the turning corners forming circulation paths through which the rolling elements roll and circulate, the rolling elements making contact with the lubricating faces and being lubricated in the process of rolling through the turning corners, wherein the lubricating face is formed in a flat shape and extends inward beyond the outer arc surface of the turning corner and the lubricating face and the outer peripheral face of the turning corner maintain the relation of crossing each other at two intersections, the lubricating face has a length longer than the distance between the two intersections, wherein the lubricating face protrudes into the turning corner in such a manner as to form a chord of an arc of the periphery of the turning corner, and the opposing two ends of the lubricating face located outside the two intersections with the arc surface, are each located at a distance outward from the turning corner which corresponds to a depth of recessed areas and the recessed areas are respectively formed between the outer peripheral face of the turning corner and portions of the lubricating face in surplus length regions determined by the difference between the length of the lubricating face and the distance between the two intersections.

* * * * *